United States Patent [19]
Treichel

[11] 3,834,284
[45] Sept. 10, 1974

[54] HYDRAULIC STEERING FOR TRACTORS AND LIKE VEHICLES

[75] Inventor: Richard Treichel, Cedar Falls, Iowa

[73] Assignee: Deere & Company, Moline, Ill.

[22] Filed: Apr. 5, 1973

[21] Appl. No.: 348,165

[52] U.S. Cl.................. 92/136, 92/138, 92/171
[51] Int. Cl..................... F01b 9/00, F16j 11/04
[58] Field of Search ............ 92/136, 171, 169, 163, 92/138, 36; 123/193 CH

[56] References Cited
UNITED STATES PATENTS

| | | | |
|---|---|---|---|
| 2,686,090 | 8/1954 | Leman | 92/171 |
| 2,844,128 | 7/1958 | Steiner | 92/136 |
| 3,209,541 | 10/1945 | Dunphy | 92/136 |
| 3,340,774 | 9/1967 | Brenneke | 123/193 CH |
| 3,650,182 | 3/1972 | Phillips | 92/169 |

*Primary Examiner*—Irwin C. Cohen
*Assistant Examiner*—A. M. Zupcic

[57] ABSTRACT

A hydraulic steering system of the class described in which steerable wheels are connected to a shaft having a pinion in mesh with the rack of a piston means and wherein each piston of the double-ended piston means is carried in a removable liner that is in turn carried in a bore or chamber of the basic housing. Each liner is constructed and mounted in such a way as to avoid axial displacement during operation of the system.

10 Claims, 5 Drawing Figures

3,834,284

HYDRAULIC STEERING FOR TRACTORS AND LIKE VEHICLES

BACKGROUND OF THE INVENTION

It is known of course to provide liners in a hydraulic motor and other cylinders but all the miscellaneous problems have yet to be solved. Any liner installation requires accurate machining and alignment, adequate seals, easy accessibility for servicing and maintenance and means for ensuring that the liner and seals do not "creep" or "chuck" (move axially) during operation. Such action creates premature wear on the seals, undue heat because of resultant friction between the liner and its mounting bore and consequent leakage of fluid.

SUMMARY OF THE INVENTION

According to the present invention, a housing or casting is provided with the necessary compartmentation to accommodate a double-ended piston means with an intermediate rack for meshing with the steering pinion. The two bores or chambers in which opposite ends of the piston means are mounted are provided respectively with liners in which the respective pistons reciprocate. For each liner, the housing has an interior shoulder against which the inner end of the liner abuts. The outer end of the liner is retained by a combination of stop plug, elastic means and fluid pressure. The fluid pressure means is such that fluid under pressure applies a force on the outer end of the liner that tends to keep the liner displaced inwardly. The stop plug is retained by the combination of a snap ring and a retainer, these two elements combining to prevent "creep" of the plug and this avoids wear on the O-ring seal between the housing and the plug. The elastic means is in the form of a "wave" spring (a ring whose radial portion is thin and annularly sinuous) and is interposed between the plug and outer end of the liner to resist outward movement of the liner when fluid flow is reversed; i.e., when fluid is exhausted in the area of the outer end of the liner. Prevention of creep between the liner and housing adds to the life of the intervening O-ring.

DESCRIPTION OF THE PREFERRED EMBODIMENT

Figure 1:
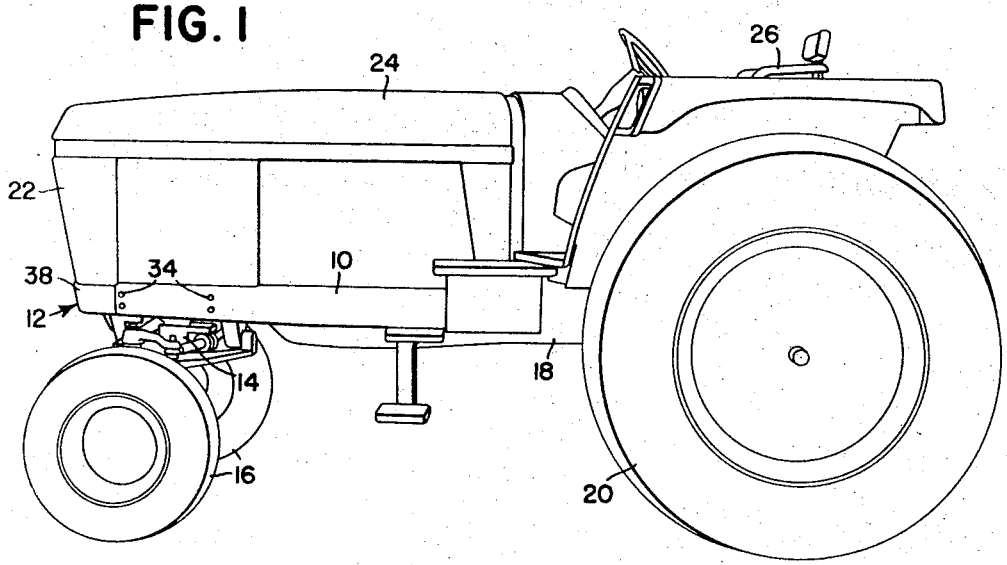
FIG. 1 is a perspective of a representative vehicle in which the present invention finds utility.

The tractor shown in FIG. 1 has a main body made up primarily of a pair of fore-and-aft side frame members 10 (see also FIG. 4), a front end structure 12 below which is a steerable front axle structure 14 having wheels 16 and a rear transmission case 18 supported on rear traction wheels 20 (only one of which appears). The tractor additionally includes a front enclosure 22, a hood 24 and an operator's station 26.

Figure 4:
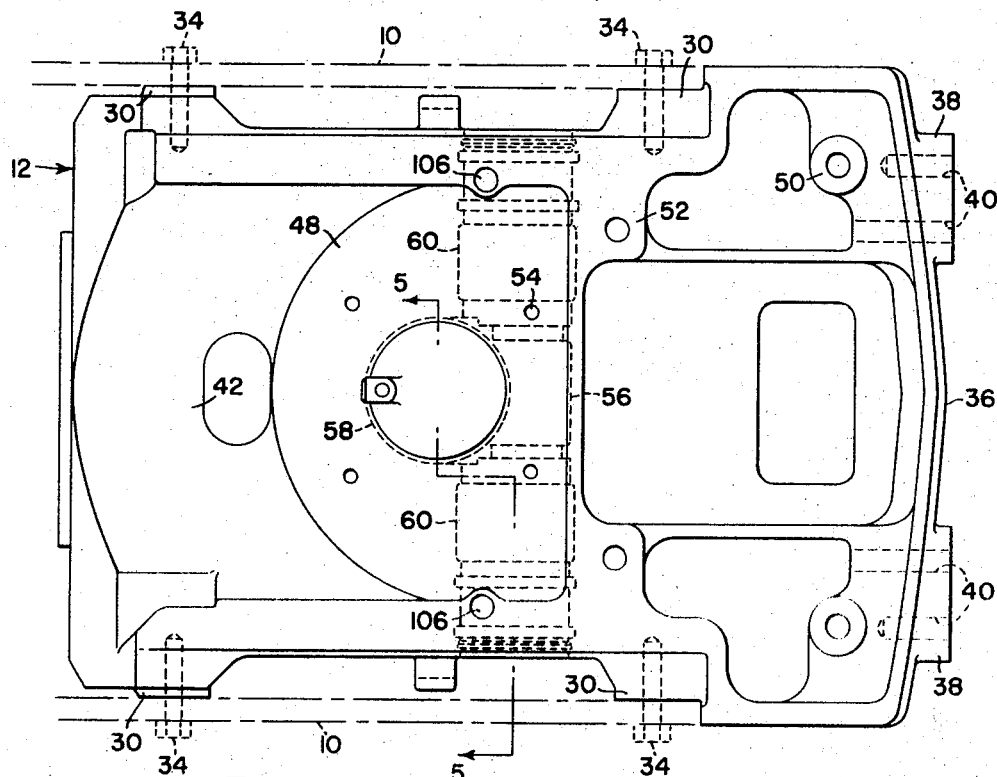
FIG. 4 is a plan view of the structure shown in FIG. 2.

The front end structure is an integrated or unitary one-piece casting having opposite side portions in the form of mounting pads 30, each being drilled and tapped at 32 for receiving cap screws 34 for rigid but removable connection to the respective side frame members 10 (FIG. 4). The casting 12 further has a forward part 36 formed with a pair of mounting pads 38 that are appropriately apertured at 40 to receive suitable fasteners (not shown) for the mounting of tractor-related accessories; e.g., bumper weights, implements, etc. (also not shown).

The casting 12 has a bottom 42 from which depends a pair of integral ears or lugs 44 drilled coaxially at 46 for reception of a pivot pin (not shown) which mounts the front axle structure 14 for limited oscillation as the tractor operates over uneven terrain. The top of the casting has mounting portions 48, 50, 52 and 54 for mounting upper components of the tractor, such as the front enclosure 22 and other parts. The one-piece casting combines the structure and functions of several individual parts used in former constructions; e.g., as in the patent referred to above. Being a casting and appropriately webbed and ribbed, it possesses more than adequate strength, particularly since it ties the basic structural components of the tractor together and eliminates "weaving" between the frame members 10 as in the past.

Of further significance is the internal compartmentation of the casting 12 so that it carries the hydraulic steering motor for the steerable front wheels 16. The basic compartmentation is best seen in dotted lines at 56 in FIG. 4. In detail the compartmentation includes a central pocket or cavity 58 formed on a vertical axis and intersected by a transverse cylindrical cavity or bore divided by the central pocket into a pair of coaxial chambers or bores 60. Each bore carries a liner 62 and these liners provide the cylinders of a hydraulic motor that includes a double-ended piston means having coaxial pistons 64 connected by an integral intermediate part in the form of a toothed rack 66.

A pinion 68 is disposed in the intermediate pocket 58 and meshes with the piston rack 66 so that reciprocation of the piston means turns the pinion and its coaxial depending pinion or steering shaft 70. This shaft is connected in usual fashion (not shown) with the tie rod means of the steerable front wheels 14. A portion of the top of the casting 12 is enlarged at 72 to receive a bushing 74 for journaling an upper coaxial shaft portion 76 of the pinion 68. The portion of the steering shaft 70 below the pinion is journaled in an antifriction bearing 78, preferably of the ball type.

For the purpose of mounting the bearing 78, the bottom 42 of the casting 12 is provided with an inverted cup-shaped recess 80 concentric with the pinion shaft and bearing. This recess is only deep enough to receive a substantial part but not all of the height of the outer race of the bearing. The remainder of the height of this outer race is received in an upwardly facing cup-shaped recess 82 in a lower quill or sleeve 84 through which the steering shaft 70 depends. Because the bearing 78 has a tight fit in both recesses 80 and 82, it serves as a "key" or "dowel" between the casting and part 84 and additional dowels, etc. are not required. The part 84 is removably secured to the casting bottom 42 as by a plurality of cap screws 86.

When it is necessary to service or remove the piston means 64-66-64, the casting 12, supported by the wheeled axle 14, may be rolled forwardly relative to the frame members 10 after the tractor has been temporarily supported at a point just rearwardly of the casting and after the connecting means or cap screws 34 are removed. Such relative forward movement spaces the axis of the steering motor ahead of the front terminal ends of the members 10 and exposes opposite end caps or retainers 88 and their cap screws 90 which are threaded into stop plugs 92. When the cap screws 86 are removed, the quill 84 may be moved downwardly, the steering shaft 70 being disconnected from the tie rod, and the pinion withdrawn downwardly. Removal of the end structures 88-90-92 enables axial removal of the double-ended piston. As an adjunct to the above, the casting 12 may be roller forwardly just enough so that the holes in the frame members 10 for the rear cap screws 34 line up with the front tapped bores 32, and two pairs of cap screws 34 (one pair at each side) may be replaced, thus keeping the casting 12 still tied to the tractor so that it does tip over about the front wheel axis.

Figure 2:
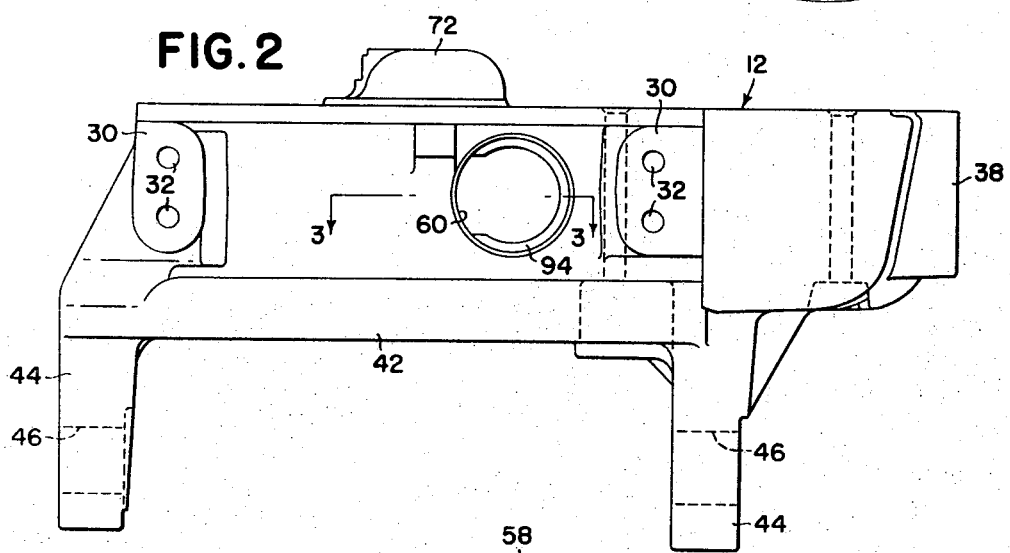
FIG. 2 is an enlarged side view of the basic casting per se, shown with its front end to the reader's right.
Figure 3:
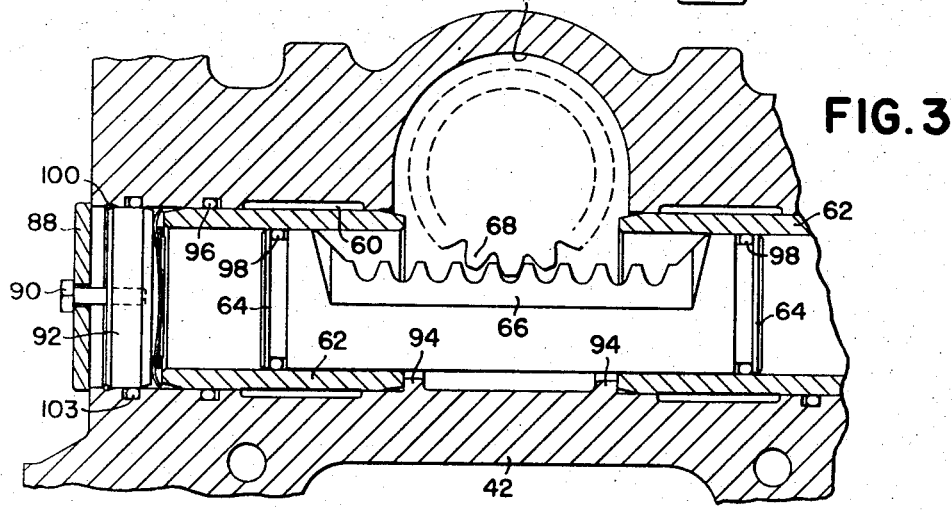
FIG. 3 is an enlarged fragmentary section as seen on the line 3—3 of FIG. 2.

Each casting cylindrical chamber or bore 60 has an internal shoulder 94 (FIGS. 2 and 3) against which the liners respectively abut. Each liner is sealed to its bore 60 by an O-ring 96, and each piston carries an O-ring 98 cooperative with its liner. Each stop plug 92 is retained by a snap ring 100 so that it is held against outward displacement. Lest the plug creep inwardly during operation, it is additionally retained by the retainer 88 and cap screw 90. The retainer has some elasticity so that it can "spring" in at its center portion when its cap screw is tightened. This keeps the plug snug against its snap ring. Each plug has an axially inward projection 102 that forms a stop for the proximate end of the piston 64 when the piston means bottoms. Without the retainer 88, the plug could creep back and forth and, when the piston bottomed, it would exert a blow on the snap ring. An O-ring 103 seals the plug to the housing 12.

Figure 5:
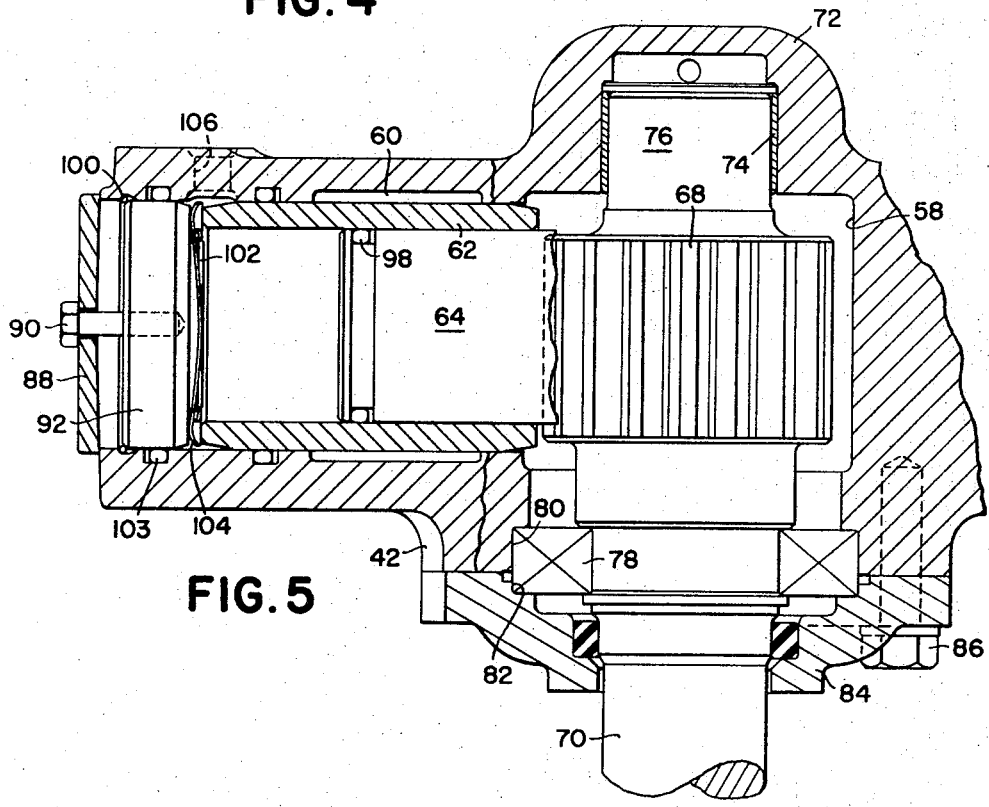
FIG. 5 is an enlarged fragmentary section on the line 5—5 of FIG. 4.

Interposed between each plug 92 and the outer end of the associated liner is elastic means, here in the form of a ring-shaped "wave" washer 104; i.e., annularly sinuous. Such washers are well known in the art. In this case the washer serves the double function of a spring and as means for enabling fluid flow through a fluid passage 106. Assuming now that fluid under pressure is introduced through the passage 106 in FIG. 5 to move the double-ended piston to the right, pressure acting on the left piston 64 also acts on the left end of the liner 62, urging the liner against its shoulder 94. The "wave" washer permits unrestricted (or substantially so) fluid flow. When the piston means is reversed and fluid flows out through the left-hand passage (FIG. 5), there is a tendency of the liner to follow the flow, but this is resited by the wave washer spring. As seen, the plug projection 102 is inwardly beyond the spring 104 so that the piston does not strike the spring.

For removal of the liner or piston means, the cap screw 90 is first unscrewed to permit removal of the retainer 88. The plug may then be forced inwardly an amount sufficient to enable the snap ring 100 to be pried out. An appropriate tool may be threaded into the now empty tapped bore left in the plug by the removal of the cap screw 90 and thus the plug may be pulled out, followed by the spring 104, etc.

Features not specifically enumerated will occur to those versed in the art, as will variations in the specific design illustrated and described.

I claim:

1. A fluid-power steering system for a vehicle of the type including a housing containing a two-way motor made up of a pair of horizontally coaxial cylinders and a double-ended piston having an intermediate toothed part providing a rack in mesh with a pinion turnable on an upright axis and wherein the cylinders open respectively at opposite sides of the housing, characterized in that each cylinder is fitted with a liner carrying the associated end of the piston and abutting at its inner end with a portion of the housing, the liner having an outer end short of the housing side, a stop plug fitting the open side of the housing and axially spaced from the outer end of the liner, the housing has a fluid port intermediate the outer end of the liner and the plug for flow to and from the piston end and elastic means are interposed between the plug and liner to urge the liner against the abutment in the housing, said elastic means being so constructed as to enable fluid flow to and from the piston end.

2. The invention defined in claim 1 in which the elastic means is an annular spring having a circumferentially sinuous configuration.

3. The invention defined in claim 1 in which the plug has an inner part of reduced diameter engageable by the piston end and the elastic means is of ring shape to encircle the reduced part.

4. The invention defined in claim 1 in which a snap ring retains the plug against outward displacement relative to the housing.

5. The invention defined in claim 4 in which means is provided between the plug and housing to prevent inward displacement of the plug.

6. The invention defined in claim 5 in which said means between the plug and housing comprises a plate-like member over the open end of the cylinder and a screw means between the member and the plug.

7. The invention defined in claim 6 in which the member is resilient so as to be inwardly springable upon tightening of the screw means.

8. The invention defined in claim 1 including first seal means between the housing and liner and second seal means between the housing and plug.

9. The invention defined in claim 1 in which the plug includes an inward projection engageable by the piston end after compression of the elastic means by the piston end.

10. The invention defined in claim 9 in which the plug is secured to the housing so as to resist displacement thereof relative to the housing in both inward and outward directions.

* * * * *